(12) United States Patent
Pretzer et al.

(10) Patent No.: US 10,711,508 B2
(45) Date of Patent: Jul. 14, 2020

(54) WINDOW ASSEMBLY FOR VEHICLE

(71) Applicant: Magna Mirrors of America, Inc., Holland, MI (US)

(72) Inventors: Drew C. Pretzer, Holland, MI (US); Michael J. Hulst, Holland, MI (US); Linh H. Pham, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 24 days.

(21) Appl. No.: 16/228,831

(22) Filed: Dec. 21, 2018

(65) Prior Publication Data

US 2019/0128049 A1 May 2, 2019

Related U.S. Application Data

(62) Division of application No. 15/259,155, filed on Sep. 8, 2016, now Pat. No. 10,167,664.

(60) Provisional application No. 62/215,942, filed on Sep. 9, 2015.

(51) Int. Cl.
*E06B 3/44* (2006.01)
*B60J 1/17* (2006.01)
*B60J 1/00* (2006.01)

(52) U.S. Cl.
CPC ............ *E06B 3/4407* (2013.01); *B60J 1/007* (2013.01); *B60J 1/17* (2013.01); *E06B 2003/4461* (2013.01)

(58) Field of Classification Search
CPC .. E06B 3/44; E06B 3/4407; E06B 2003/4453; E06B 2003/4461; B60J 1/007; B60J 1/17
See application file for complete search history.

(56) References Cited

U.S. PATENT DOCUMENTS

| | | | |
|---|---|---|---|
| 1,637,367 A | 8/1927 | Zimmers et al. | |
| 1,913,726 A * | 6/1933 | Sevison | E06B 3/44 49/209 |
| 2,023,699 A | 12/1935 | Robinson | |
| 2,207,772 A * | 7/1940 | Axe | E06B 3/44 49/418 |
| 2,455,462 A | 12/1948 | Bader et al. | |
| 2,502,320 A | 3/1950 | Guernsey | |
| 2,762,648 A | 9/1956 | Huzzard | |
| 2,772,915 A | 12/1956 | Renno | |
| 2,787,347 A * | 4/1957 | Henderson | E06B 3/44 52/213 |

(Continued)

*Primary Examiner* — Justin B Rephann
(74) *Attorney, Agent, or Firm* — Honigman LLP

(57) ABSTRACT

A window assembly for a vehicle includes a fixed frame having a pair of opposite side frame members, an upper frame member and a lower frame member. A fixed window panel is disposed at a lower portion of the side frame members and at the lower frame member. A movable window panel is movable relative to the fixed window panel and the frame between an opened position and a closed position. Each of the side frame members includes a lower channel for receiving a side perimeter edge region of the fixed window panel and an end region of the lower frame member. An elastomeric seal is overmolded along the lower channel of the side frame member and is configured to receive and seal against (i) the side perimeter edge region of the fixed window panel and (ii) the end region of the lower frame member.

22 Claims, 8 Drawing Sheets

(56) References Cited

U.S. PATENT DOCUMENTS

| | | |
|---|---|---|
| 2,814,525 A | 11/1957 | Thomas |
| 2,820,992 A * | 1/1958 | Clayton-Wright ....... B60J 10/70 |
| | | 52/204.51 |
| 3,174,194 A | 3/1965 | Ward |
| 3,186,755 A | 6/1965 | Ward |
| 3,283,455 A | 11/1966 | Riegelman |
| 3,442,059 A | 5/1969 | Kessler |
| 3,742,649 A | 7/1973 | Dochnahl |
| 4,042,004 A | 8/1977 | Kwan |
| 4,072,338 A | 2/1978 | Lawrence et al. |
| 4,119,341 A | 10/1978 | Cook |
| 4,343,121 A | 8/1982 | Kruschwitz et al. |
| 4,364,214 A | 12/1982 | Morgan et al. |
| 4,364,595 A | 12/1982 | Morgan et al. |
| 4,405,175 A | 9/1983 | Hoffmann |
| 4,431,228 A | 2/1984 | Grise |
| 4,454,688 A | 6/1984 | Rest et al. |
| 4,530,192 A | 7/1985 | Ginster |
| 4,561,224 A | 12/1985 | Jelens |
| 4,604,830 A | 8/1986 | Maeda et al. |
| 4,608,779 A | 9/1986 | Maeda et al. |
| 4,619,479 A | 10/1986 | Martin, Jr. |
| 4,656,784 A | 4/1987 | Brachmann |
| 4,703,598 A | 11/1987 | Wilson et al. |
| 4,785,583 A | 11/1988 | Kawagoe et al. |
| 4,793,099 A | 12/1988 | Friese et al. |
| 4,833,847 A | 5/1989 | Inayama et al. |
| 4,875,307 A | 10/1989 | Barbero |
| 4,932,161 A | 6/1990 | Keys et al. |
| 5,040,333 A | 8/1991 | Mesnel et al. |
| 5,054,242 A | 10/1991 | Keys et al. |
| 5,069,497 A | 12/1991 | Clelland |
| 5,139,307 A | 8/1992 | Koops et al. |
| 5,169,205 A | 12/1992 | James |
| 5,228,740 A | 7/1993 | Saltzman |
| 5,276,338 A | 1/1994 | Beyer et al. |
| 5,345,717 A | 9/1994 | Mori et al. |
| 5,345,719 A | 9/1994 | Karwande |
| 5,355,651 A | 10/1994 | Correia |
| 5,421,125 A | 6/1995 | Camp et al. |
| 5,429,844 A | 7/1995 | Galardi |
| 5,441,688 A | 8/1995 | Goto et al. |
| 5,442,880 A | 8/1995 | Gipson |
| 5,456,049 A | 10/1995 | Goto et al. |
| 5,522,191 A | 6/1996 | Wenner et al. |
| 5,551,197 A | 9/1996 | Repp et al. |
| 5,566,510 A | 10/1996 | Hollingshead et al. |
| 5,584,526 A | 12/1996 | Soldner |
| 5,688,016 A | 11/1997 | Gold |
| 5,702,148 A | 12/1997 | Vaughan et al. |
| 5,732,509 A | 3/1998 | Buehler et al. |
| 5,735,089 A | 4/1998 | Smith et al. |
| 5,743,047 A | 4/1998 | Bonne et al. |
| 5,752,352 A | 5/1998 | Goto et al. |
| 5,758,459 A | 6/1998 | Koike et al. |
| 5,779,956 A | 7/1998 | Hollingshead et al. |
| 5,791,088 A | 8/1998 | Martinelli et al. |
| 5,799,444 A | 9/1998 | Freimark et al. |
| 5,803,527 A | 9/1998 | Fujiya |
| 5,806,257 A | 9/1998 | Cornils et al. |
| 5,809,707 A | 9/1998 | Bargados et al. |
| 5,846,463 A | 12/1998 | Keeney et al. |
| 5,853,895 A | 12/1998 | Lewno |
| 5,935,356 A | 8/1999 | Soldner |
| 5,988,730 A | 11/1999 | Bekaert |
| 5,996,284 A | 12/1999 | Freimark et al. |
| 5,996,285 A | 12/1999 | Guillemet et al. |
| 6,030,020 A | 2/2000 | Malm |
| 6,082,674 A | 7/2000 | White et al. |
| 6,134,851 A | 10/2000 | Roze et al. |
| 6,138,414 A | 10/2000 | Ohmori et al. |
| 6,206,453 B1 | 3/2001 | Farrar et al. |
| 6,220,650 B1 | 4/2001 | Davis et al. |
| 6,224,136 B1 | 5/2001 | Takagi |
| 6,227,598 B1 | 5/2001 | Ichioka et al. |
| 6,286,891 B1 | 9/2001 | Gage et al. |
| 6,287,402 B2 | 9/2001 | Soldner |
| 6,299,235 B1 | 10/2001 | Davis et al. |
| 6,312,043 B1 | 11/2001 | Blackburn et al. |
| 6,389,763 B1 | 5/2002 | Clauss |
| 6,394,529 B2 | 5/2002 | Davis et al. |
| 6,409,244 B1 | 6/2002 | Nagahashi et al. |
| 6,425,215 B2 | 7/2002 | Farrar |
| 6,572,176 B2 | 6/2003 | Davis et al. |
| 6,585,311 B2 | 7/2003 | Farrar et al. |
| 6,591,552 B1 | 7/2003 | Rasmussen |
| 6,669,267 B1 | 12/2003 | Lynam et al. |
| 6,685,254 B2 | 2/2004 | Emmons et al. |
| 6,691,464 B2 | 2/2004 | Nestell et al. |
| 6,729,031 B2 | 5/2004 | McKee |
| 6,729,674 B2 | 5/2004 | Davis et al. |
| 6,793,269 B2 | 9/2004 | Pugh et al. |
| 6,817,144 B1 | 11/2004 | Tavivian |
| 6,817,651 B2 * | 11/2004 | Carvalho ............... B60J 10/235 |
| | | 296/146.15 |
| 6,826,883 B2 | 12/2004 | Guzman et al. |
| 6,830,290 B2 | 12/2004 | De Gaillard |
| 6,869,128 B2 | 3/2005 | Farrar et al. |
| 6,902,224 B2 | 6/2005 | Weinert et al. |
| 7,003,916 B2 | 2/2006 | Nestell et al. |
| 7,073,293 B2 | 7/2006 | Galer |
| 7,097,232 B2 | 8/2006 | Beaudry et al. |
| 7,146,769 B1 | 12/2006 | Culverson |
| 7,152,906 B1 | 12/2006 | Farrar et al. |
| 7,155,862 B2 | 1/2007 | Bourque et al. |
| 7,210,729 B2 | 5/2007 | Hammaker et al. |
| 7,219,470 B2 | 5/2007 | Lahnala |
| 7,287,802 B2 | 10/2007 | Dankert et al. |
| 7,305,766 B1 | 12/2007 | Timmermans |
| 7,427,096 B2 | 9/2008 | Snider et al. |
| RE40,636 E | 2/2009 | Weinert et al. |
| 7,568,316 B2 | 8/2009 | Choby et al. |
| 7,571,568 B2 | 8/2009 | Ito et al. |
| 7,703,836 B2 | 4/2010 | Snider et al. |
| 8,042,859 B2 * | 10/2011 | Kimoto ................. B60J 5/0402 |
| | | 296/146.1 |
| 8,245,462 B2 | 8/2012 | Miethe et al. |
| 8,246,101 B2 | 8/2012 | Cicala |
| 8,250,812 B2 | 8/2012 | Hebert et al. |
| 8,272,168 B2 | 9/2012 | Lahnala |
| 8,316,583 B2 | 11/2012 | Lahnala |
| 8,322,075 B2 | 12/2012 | Lahnala |
| 8,388,043 B2 | 3/2013 | Lahnala |
| 8,495,841 B2 | 7/2013 | DeGroff |
| 8,776,435 B2 | 7/2014 | Hulst |
| 8,881,458 B2 | 11/2014 | Snider et al. |
| 10,167,664 B2 | 1/2019 | Pretzer et al. |
| 2002/0095868 A1 | 7/2002 | McCauley |
| 2002/0117874 A1 | 8/2002 | Taylor |
| 2003/0070371 A1 | 4/2003 | Kobrehel |
| 2003/0137161 A1 | 7/2003 | Gillen |
| 2003/0182865 A1 | 10/2003 | Nestell et al. |
| 2003/0209922 A1 | 11/2003 | Emmons et al. |
| 2003/0213179 A1 | 11/2003 | Galer |
| 2004/0020131 A1 | 2/2004 | Galer et al. |
| 2004/0100121 A1 | 5/2004 | Bourque et al. |
| 2005/0076573 A1 | 4/2005 | Rivera |
| 2005/0161975 A1 | 7/2005 | Nieminski et al. |
| 2006/0010770 A1 * | 1/2006 | Groh ..................... E06B 7/32 |
| | | 49/169 |
| 2006/0059799 A1 | 3/2006 | Zimmer et al. |
| 2006/0101738 A1 | 5/2006 | Lethers et al. |
| 2006/0107600 A1 | 5/2006 | Nestell et al. |
| 2007/0157522 A1 | 7/2007 | Hebert et al. |
| 2008/0122262 A1 | 5/2008 | Cicala |
| 2008/0216410 A1 | 9/2008 | Lahnala |
| 2009/0256398 A1 | 10/2009 | Ota |
| 2009/0309391 A1 | 12/2009 | Krause |
| 2010/0102597 A1 | 4/2010 | Ellis |
| 2011/0192091 A1 | 8/2011 | Smith et al. |
| 2012/0068500 A1 | 3/2012 | Nania |
| 2012/0216461 A1 | 8/2012 | Coldre et al. |
| 2012/0279136 A1 | 11/2012 | Miethe et al. |
| 2013/0174488 A1 | 7/2013 | Snider et al. |

(56) References Cited

U.S. PATENT DOCUMENTS

| | | |
|---|---|---|
| 2013/0292965 A1 | 11/2013 | Prater et al. |
| 2014/0007509 A1 | 1/2014 | Huist |
| 2014/0170357 A1 | 6/2014 | Tooker et al. |
| 2015/0101254 A1 | 4/2015 | Tooker et al. |
| 2015/0115649 A1 | 4/2015 | Tooker et al. |
| 2015/0173586 A1* | 6/2015 | Kutto .................. A47L 15/4263 312/228 |
| 2015/0374200 A1 | 12/2015 | Kutto et al. |

* cited by examiner

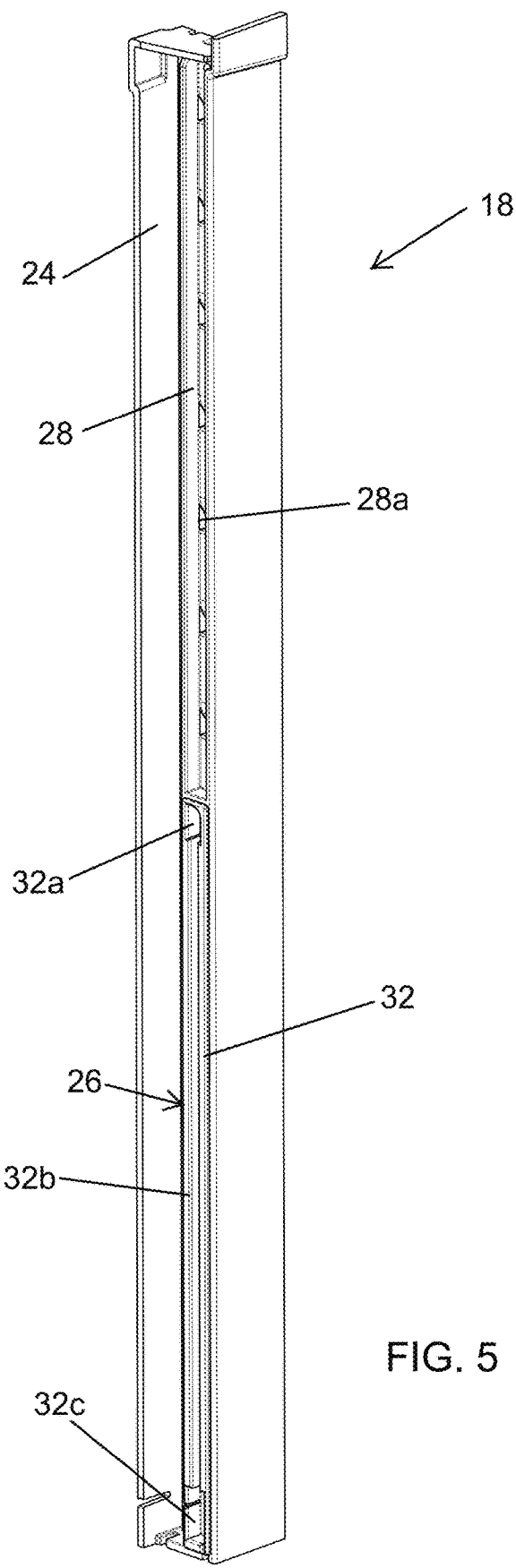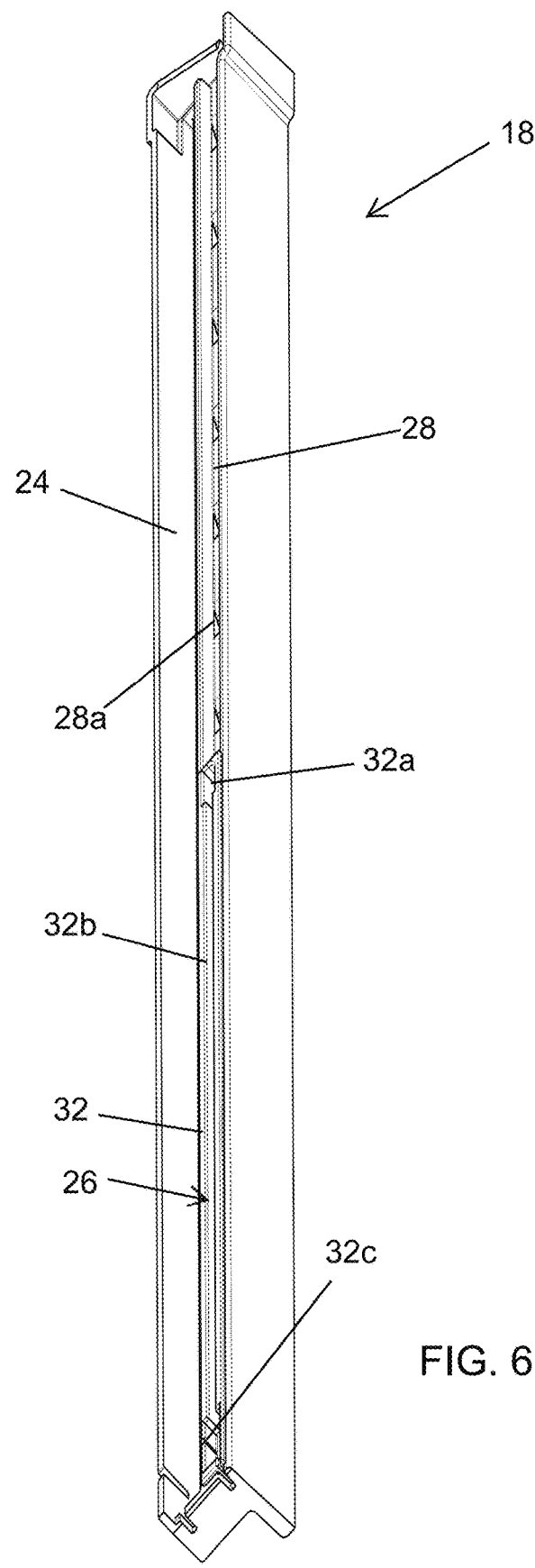
FIG. 5
FIG. 6

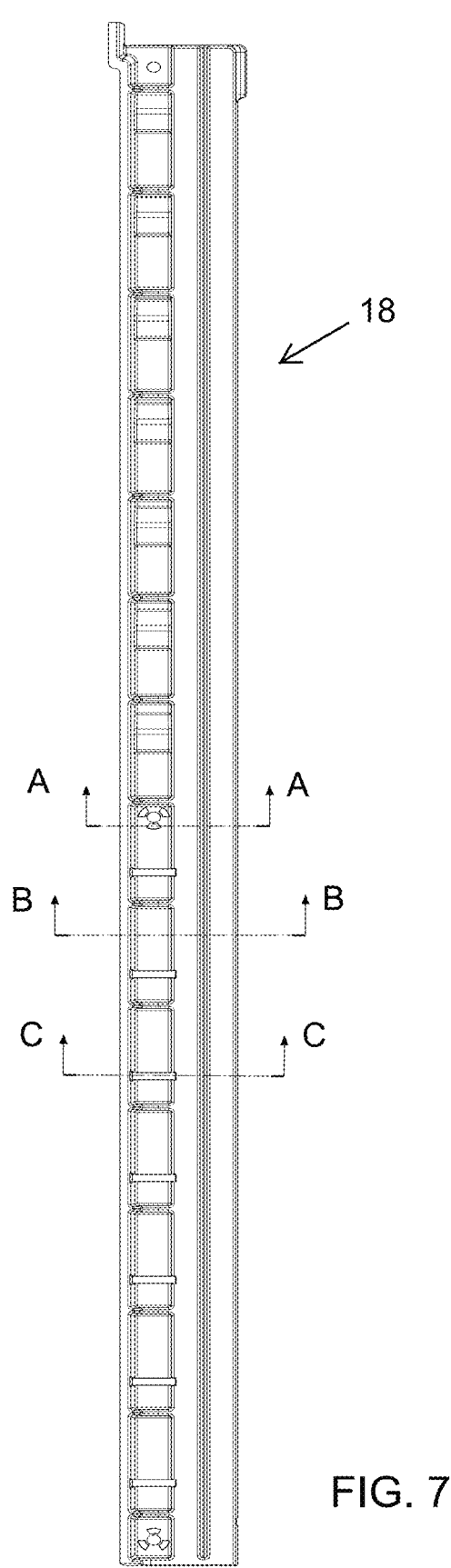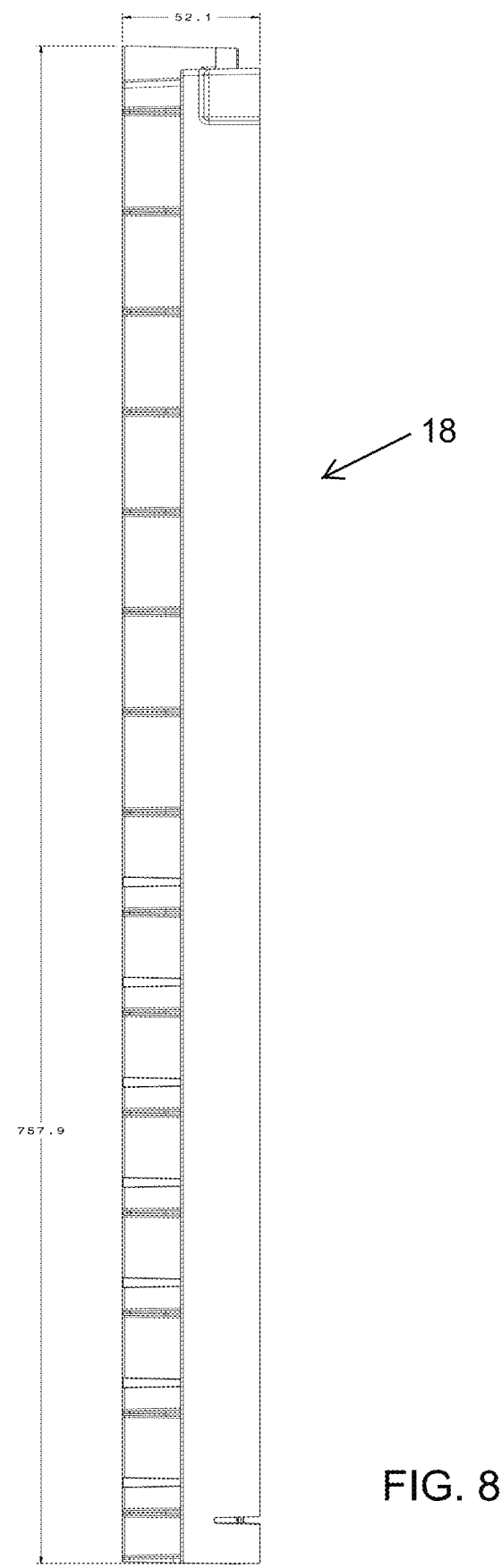
FIG. 7
FIG. 8

WINDOW ASSEMBLY FOR VEHICLE

CROSS REFERENCE TO RELATED APPLICATIONS

The present application is a division of U.S. patent application Ser. No. 15/259,155, filed Sep. 8, 2016, now U.S. Pat. No. 10,167,664, which claims the filing benefits of U.S. provisional application Ser. No. 62/215,942, filed Sep. 9, 2015, which is hereby incorporated herein by reference in its entirety.

FIELD OF THE INVENTION

The present invention relates to windows for vehicles and, more particularly, to window assemblies including window panels and frames for transit vehicles, such as school buses or the like.

BACKGROUND OF THE INVENTION

Vehicle window assemblies, such as for school buses and the like, typically include a frame that includes four aluminum side frame portions that are screwed or fastened together at the corners of the frame. The window panels, typically one fixed window panel and one movable window panel, are retained within channels along the frame portions while the frame portions are fastened together to form the window assembly.

SUMMARY OF THE INVENTION

The present invention provides a window assembly or window module or window unit for a vehicle, such as a transit vehicle or school bus, that includes a polymeric or plastic frame and a fixed window panel partially encapsulated or surrounded by the frame and a movable window assembly or unit that includes a movable window panel encompassed or surrounded by a movable frame or carrier and that is movable relative to the frame and the fixed window panel between opened and closed positions. The plastic frame (which may be formed via injection molding) includes an elastomeric seal that is overmolded (such as via a second injection molding process) over portions of the frame to provide a seal against the fixed window panel when the window assembly is assembled. The frame (such as a polycarbonate or acrylonitrile styrene acrylate (ASA) material or the like) and seal (such as a thermoplastic elastomer (TPE) or the like) may be formed via a two shot molding process, with the first shot molding the frame or at least the side frame members or portions and the second shot molding the elastomeric seal at the selected portions of the frame or frame members.

These and other objects, advantages, purposes and features of the present invention will become apparent upon review of the following specification in conjunction with the drawings.

BRIEF DESCRIPTION OF THE DRAWINGS

FIGS. 5 and 6 are perspective views of a vertical frame member of the frame of the window assembly of the present invention;

FIG. 7 is a plan view of the vertical frame member of FIGS. 5 and 6;

FIG. 8 is another plan view of the vertical frame member of FIGS. 5 and 6;

DESCRIPTION OF THE PREFERRED EMBODIMENTS

Figure 1:
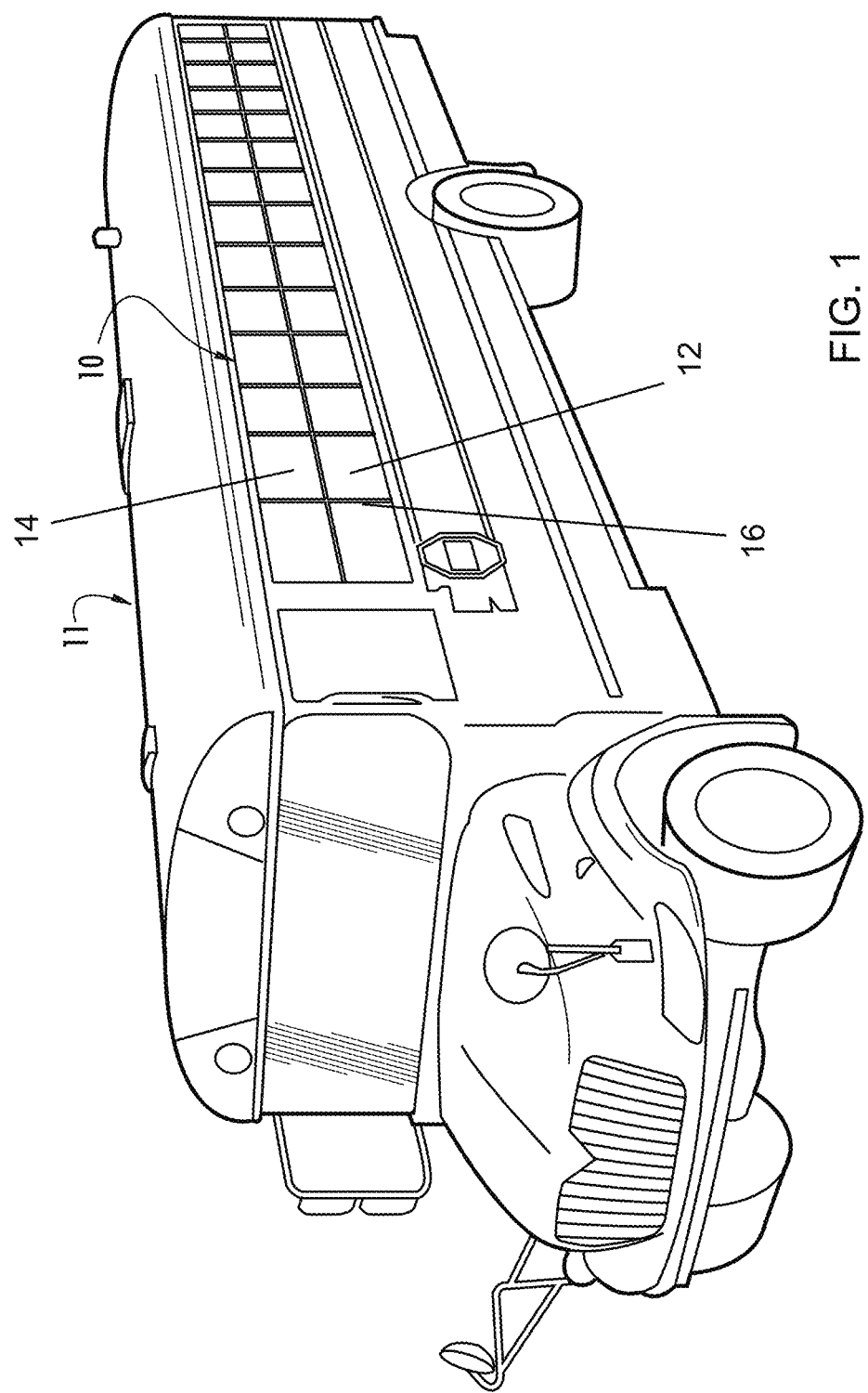
FIG. 1 is a perspective view of a school bus incorporating a plurality of window assemblies in accordance with the present invention.

Referring now to the drawings and the illustrative embodiments depicted therein, a window assembly or window module or window unit 10 may be mounted at an opening of a transit vehicle, such as a school bus 11 or the like (FIG. 1). Window assembly 10 comprises a modular window assembly that includes a fixed window pane or panel 12 fixedly attached to a perimeter frame 16, and a movable or slidable window unit or assembly 14 that includes and supports a movable window pane or panel 15 and that slides or moves along perimeter frame 16, and that moves generally vertically relative to the fixed window panel 12 to open and close the window assembly. As shown in FIG. 1, a plurality of window assemblies or modules 10 are installed along the side of the school bus. The window assemblies may be closely spaced next to one another and may provide a substantially continuous, flush row of window panels along the sides of the school bus. The fixed window panel and movable window panel may comprise any suitable material, such as glass or polycarbonate panels or substrates or the like, without affecting the scope of the present invention. The window assembly includes a perimeter fixed frame with the fixed window panel disposed at a portion of the frame (such as a lower portion of the frame) and with the movable window panel movable along the perimeter fixed frame, as discussed below. The movable window unit 14 is movable along the perimeter frame and relative to the fixed window panel between a closed position (FIG. 2) and an opened position (FIG. 3).

Figure 2:
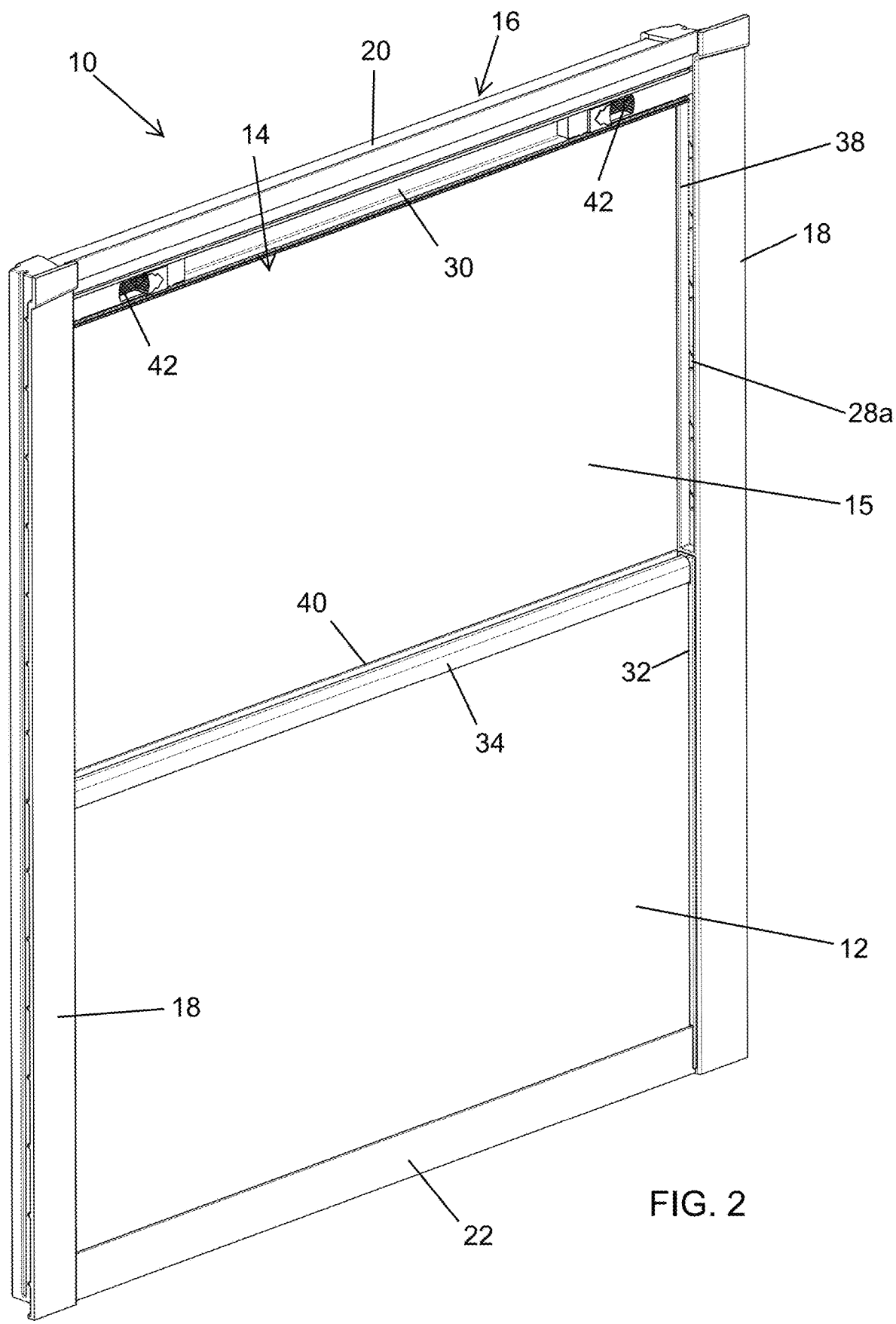
FIG. 2 is a perspective view of a window assembly having a movable window that is movable along the side channels of the window assembly in accordance with the present invention, shown with the movable window in its closed position.
Figure 3:
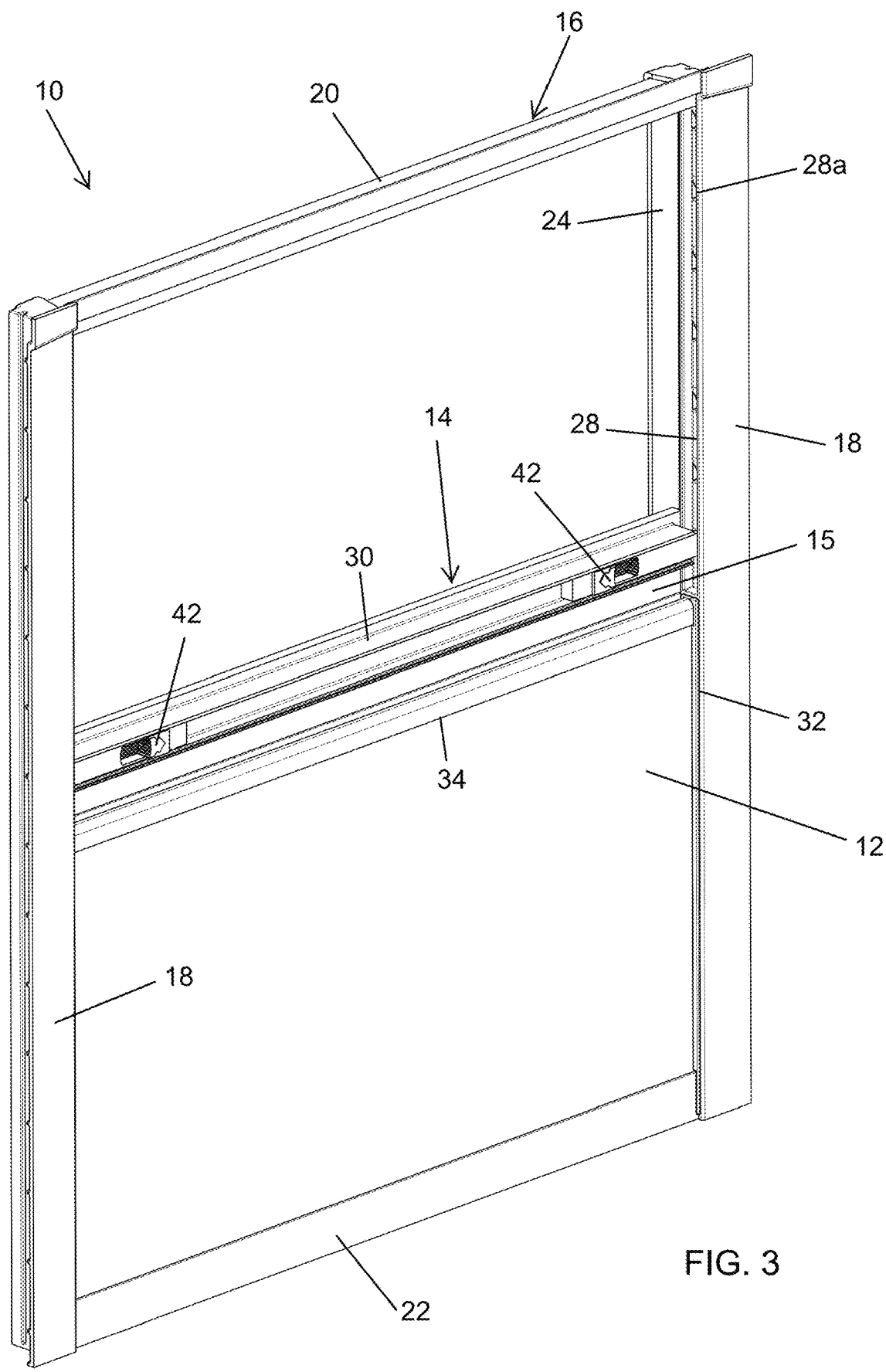
FIG. 3 is another perspective view of the window assembly of FIG. 2, shown with the movable window in its opened position.
Figure 4:
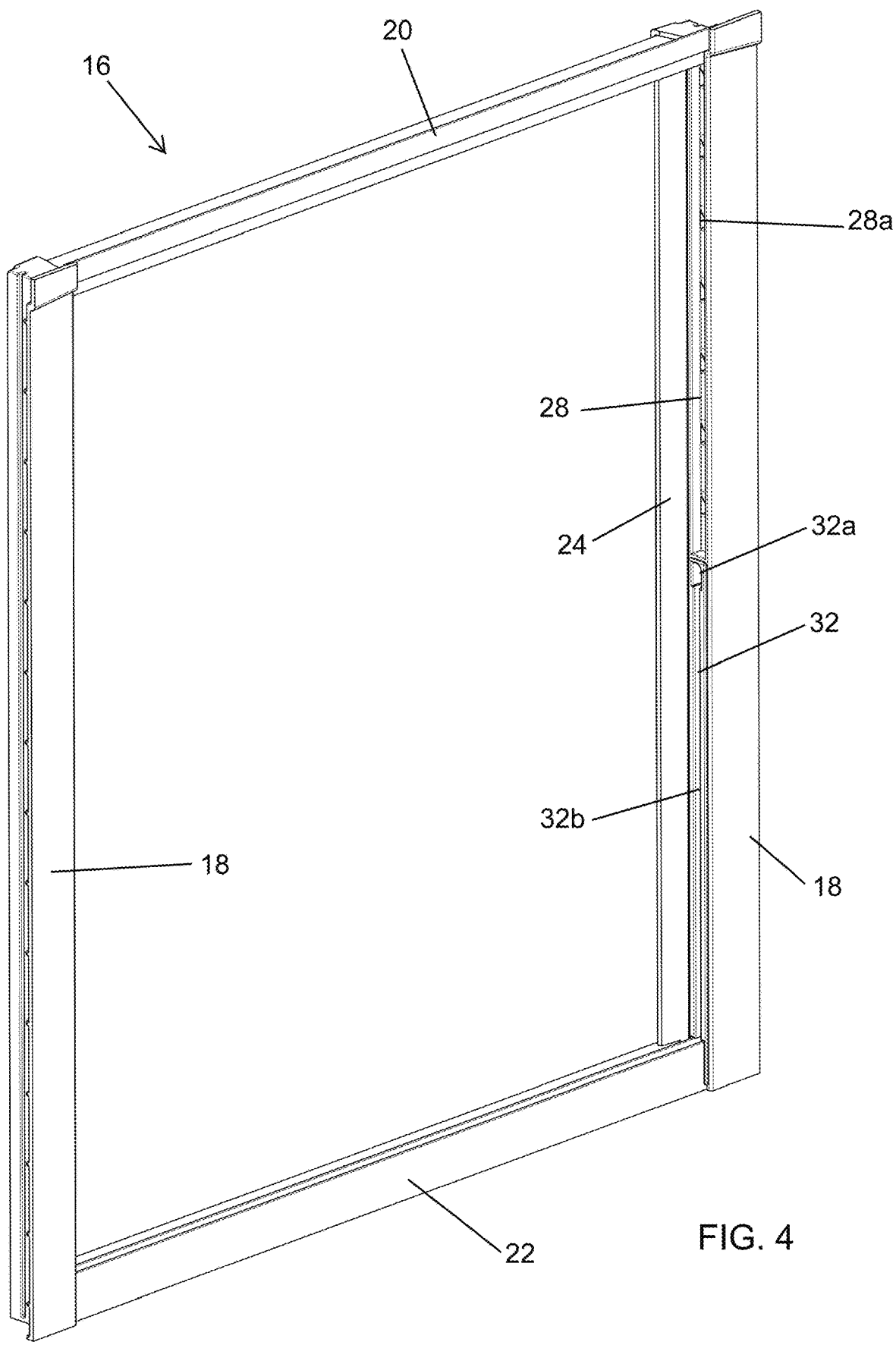
FIG. 4 is a perspective view of the perimeter frame of the window assembly of the present invention, shown without the fixed or movable window panels.
Figure 7A:
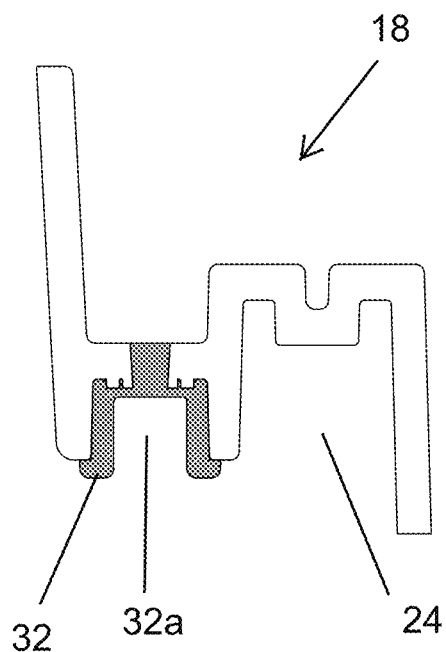
FIG. 7A is sectional view of the vertical frame member taken along the line A-A in FIG. 7.
Figure 7B:
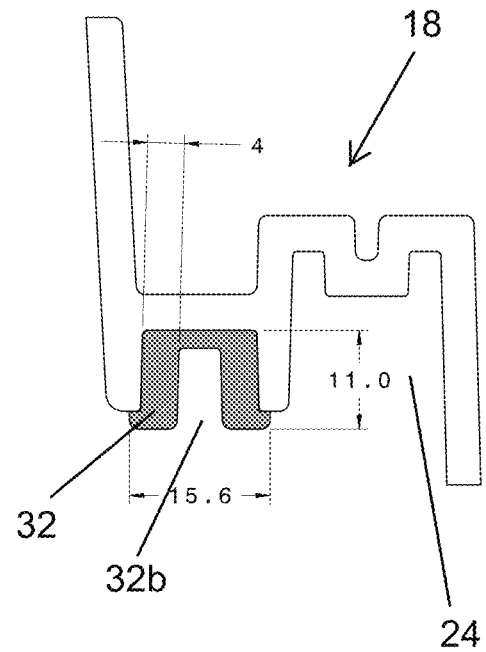
FIG. 7B is sectional view of the vertical frame member taken along the line B-B in FIG. 7.
Figure 7C:
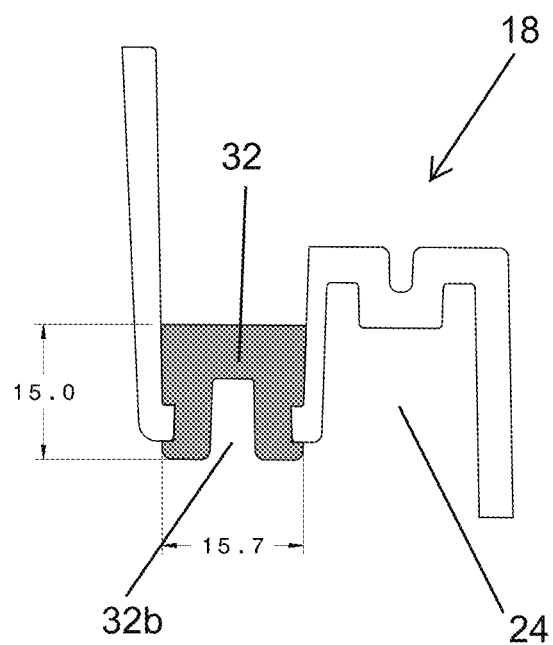
FIG. 7C is sectional view of the vertical frame member taken along the line C-C in FIG. 7.
Figure 9:
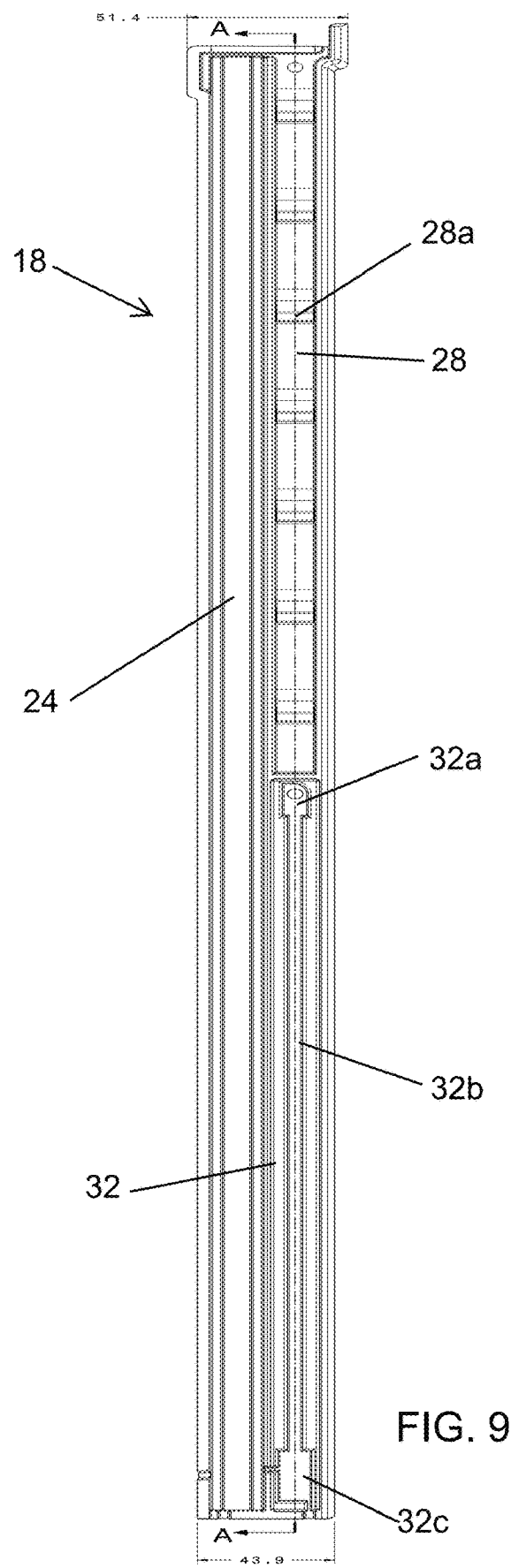
FIG. 9 is another plan view of the vertical frame member of FIGS. 5 and 6.
Figure 9A:
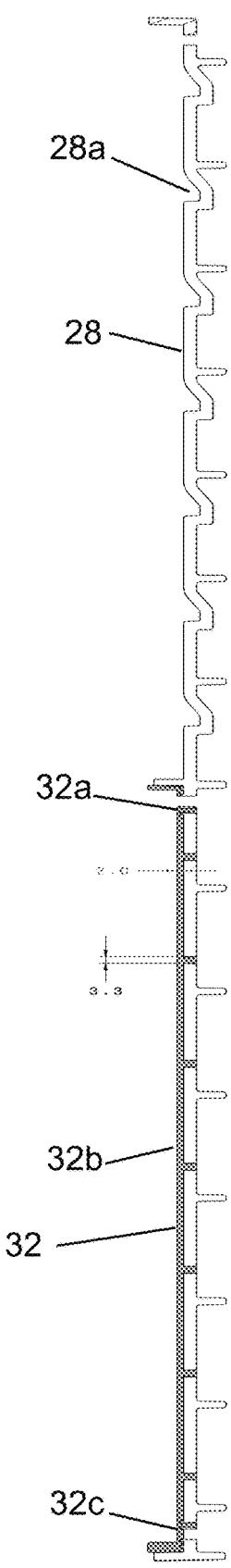
FIG. 9A is a sectional view of the vertical frame member taken along the line A-A in FIG. 9.

As shown in FIGS. 2-4, perimeter frame 16 of window assembly 10 includes a pair of generally vertical channel members or side frame members or split sash side rails 18 and a generally horizontal upper channel or frame member 20 and a generally horizontal lower channel or frame member 22. The frame members may be formed of any suitable material, and may be molded (such as via injection molding or the like) or extruded to the desired form (if each member is extruded, the ends of adjacent members may be joined together, such as via ultrasonic welding or bonding or the like). For example, the perimeter frame or fixed frame may comprise a substantially rigid material, such as a substantially rigid polymeric or plastic material, such as glass filled nylon, PVC, polyethylene terephthalate (PET), polypropylene, nylon, acrylonitrile-butadeine-styrene (ABS) or thermoplastic urethane (TPU) or the like. Optionally, the perimeter frame may also or otherwise comprise, for example, a metallic material or a composite material, such as a filled polymeric material, or the perimeter frame may comprise a metal member that is encapsulated in plastic or polymeric material or the like.

The side frame members 18 include an outer sliding channel 24, along which the movable window panel moves as it is moved between its opened and closed positions, and a lower channel or portion 26 where the fixed window panel 12 is attached or received, and an upper channel or portion 28 where an upper frame member 30 of the movable window panel is slidably received. The movable window panel is slidably received in the outer sliding channel 24 such that the movable window panel, when opened, is disposed outboard of the fixed window panel. In the illustrated embodiment, the outer sliding channel 24 is configured to maintain the movable window panel in a generally vertical plane when in both its opened and closed states. Optionally, the movable window panel may move along a channel that guides the movable window so that the movable window panel is generally flush with the fixed window panel when the movable window panel is closed, such as by utilizing aspects of the window assemblies described in U.S. Pat. No. 8,776, 435, which is hereby incorporated herein by reference in its entirety.

The side frame member 18 includes an elastomeric seal 32 disposed at or established at the lower portion or channel 26 where the fixed window panel 12 is attached or received. The seal 32 comprises a flexible or elastomeric sealing material that seals against the fixed window panel to provide a substantially water-tight seal between the fixed window panel and the side frame members 18 when the fixed window panel is received in and secured at the channels of the side frame members 18 during assembly of the window assembly.

The elastomeric seal 32 is overmolded (such as via injection molding or the like) over portions of the side frame member 18 and within the lower channel 26 of the side frame member to provide a seal against the fixed window panel 12 when the window assembly is assembled. The side frame members may comprise a polycarbonate or acrylonitrile styrene acrylate (ASA) material or the like, and the seal may comprise a thermoplastic elastomer (TPE) or the like that is formed at or in the channel of the side frame member, such as via an overmolding process that molds the seal at and over the molded or formed side frame member. Optionally, the side frame member and seal construction may be formed via a two shot molding process, with the first shot molding the side frame member and the second shot molding the elastomeric seal at the selected portion of the side frame member.

In the illustrated embodiment, the perimeter frame 16 fixedly supports fixed window panel 12 at a lower region or portion or half of the window assembly 10. As shown in FIGS. 2 and 3, an upper perimeter frame element or center frame element or member 34 is disposed along an upper edge region of the fixed window panel 12, and the lower frame member 22 is disposed along the lower edge region of the fixed window panel. Each of the side frame members 18 includes a respective channel 26, which is formed with a substantially constant width along its length.

As can be seen with reference to FIGS. 7A-C and 9A, the seal 32 is formed or overmolded along the channel 26 and through apertures and/or slots (see FIGS. 7A, 7C and 9A) formed through the side frame member 18 to enhance retention of the seal at the side frame member. The seal 32 is formed within and along the channel 26 so as to have a wider channel or receiving portion at an upper end region 32a for receiving the end of the upper fixed frame element 34 therein and a narrower channel or receiving portion 32b along the channel. Similar to the upper end region 32a, the seal 32 is formed so as to have a wider channel or receiving portion at a lower end region 32c for receiving the end of the lower frame member 22 therein. Thus, a side edge region of fixed window panel 12 is received along narrower channel portion 32b of seal 32 and the end of the upper frame element 34 is received in wider channel portion 32a and the end of the lower frame member 22 is received in lower wider channel portion 32c.

The overmolded seal of the present invention thus may be molded in a generally constant width channel and the seal may be formed (via the mold body) to provide different width channels or channel portions within the frame channel, in order to accommodate the fixed window and frame members. The different widths of the channel portions of the seal are provided by the seal configuration, which may be overmolded or disposed in a constant width channel of the frame member. Thus, the overmolded seal can be molded to provide the desired dimensions to receive the side perimeter region of the fixed window panel (including the ends of the upper and lower frame elements) in the seal, with the seal being resilient so as to conform to and seal against the inner and outer surfaces of the window panel and upper and lower frame elements so as to provide a substantially water-tight seal along the perimeter of the fixed window. Optionally, the lower perimeter frame portion may have a seal disposed therein or overmolded thereon in a similar manner so as to receive and seal against the lower perimeter edge region of the fixed window panel.

Optionally, the upper frame element 34 may be bonded to the upper perimeter edge region of fixed window panel 12 or the frame element may comprise an encapsulation or extrusion or wrapping element that encapsulates or overlays or wraps around and along the upper perimeter edge of the fixed window panel. Such an encapsulation or extrusion (which may comprise a metallic material, such as aluminum or the like, or a plastic or polymeric material) may be provided to meet safety regulations for glass windows in transit vehicles and the like.

The movable window or window assembly or unit 14 may comprise a glass or plastic window panel that is surrounded by a movable plastic or polymeric or metallic frame that includes a pair of generally vertical side slide rails or frame members 38 and the generally horizontal upper channel or frame member 30 and a generally horizontal lower channel or frame member 40. The movable frame may be bonded to an inner surface of the movable window panel about the periphery of the movable window panel. The side rails 38 are configured to be received in the respective outer sliding channels 24 established along the side fixed frame members 18 to guide the movable window unit 14 as it is moved between its opened and closed positions.

Optionally, and desirably, the movable window unit 14 may be selectively opened to and retained at multiple positions along the side frame members 18 and may be selectively retained at a selected or appropriate location or degree of opening. In the illustrated embodiment, the upper frame member 30 of the movable frame includes a pair of adjustable pins that are biased outwardly from the movable window frame and towards and into the respective channels 28 and move along the channels 28 as the movable window panel is moved between its opened and closed positions. The upper channels 28 of the side frame members 18 include stops or recesses or indentations 28a established and spaced apart along the channels. The pins are biased towards and received in the stops 28a to retain the movable window unit 14 in a desired or selected position.

The pins are manually retracted via adjustment mechanisms or slide elements or latching mechanism 42 at the upper rail or frame member 30. Thus, a user may readily retract or disengage the pin from a stop 28a to allow for movement of the movable window unit along the side frames 18 between its opened and closed positions. When the user releases the latching mechanism, the biasing element urges the pin towards the channel and into the stop or aperture when the pin is generally aligned with the stop. In the illustrated embodiment, the side frames 18 include multiple stops 28a spaced apart along channel 28 so that the movable window unit 14 may be retained at its fully closed position and at its fully opened position and at multiple locations between its fully closed and opened positions.

Optionally, the window assembly 10 may utilize aspects of the window assemblies described in U.S. Pat. Nos. 8,881,458; 8,776,435; 8,495,841 and/or 7,427,096, which are hereby incorporated herein by reference in their entireties. Although shown and described as having a vertically movable window that is movable relative to a single fixed window panel, it is envisioned that aspects of the present invention may be suitable for use in other types of window assemblies having movable windows, such as horizontally movable windows or other vertically movable windows such as those described in U.S. Pat. No. 7,427,096, which is hereby incorporated herein by reference in its entirety.

When installed at the vehicle 11 (such as a school bus or other transit vehicle or the like), the window assembly is received in an opening formed at the vehicle and may be inserted into the opening from inside the vehicle. For example, the window assembly 10 may be inserted into the opening of the vehicle sheet metal until a sealing flange (and/or a bead of sealant, such as a butyl bead or tape or the like) at both of the side frame members 18 engages or seals against a respective flange of the vehicle sheet metal or body or frame of the vehicle 11 (such as an outer flange of a generally U-shaped bow or member of the vehicle frame or body or sheet metal). The flexible window seals and flexible rail seals may comprise any suitable material, such as, for example, a polypropylene material (PPE) or EPDM material, and/or may utilize aspects of the seals and seal materials described in U.S. Pat. No. 6,220,650, which is hereby incorporated herein by reference in its entirety.

Thus, the present invention provides a movable window assembly with a movable window that is moved alongside frames or rails between an opened and closed position relative to a fixed window panel and aperture or opening, with the glass window panels bonded or otherwise attached to or received at the respective frames or frame portions (such as by utilizing aspects of the window assemblies described in U.S. Pat. Nos. 8,881,458; 5,853,895 and/or 5,551,197, which are hereby incorporated herein by reference in their entireties). The frame members, such as the vertical side frame members, include an elastomeric seal disposed or overmolded in and along the channel that receives the fixed window panel so as to substantially seal the frame relative to the fixed window panel.

The seal is overmolded onto and along the side frame member, such as via a two shot molding process that first molds the side frame member and then molds the elastomeric seal at or over or along the molded side frame member. The overmolded seal thus provides enhanced assembly of the window assembly by avoiding the need for a separate seal to be disposed at or along the fixed window panel. The overmolded seal may also provide enhanced sealing against the different width parts that are received in the seal and channel of the fixed side frame members.

Changes and modifications to the specifically described embodiments may be carried out without departing from the principles of the present invention, which is intended to be limited only by the scope of the appended claims as interpreted according to the principles of patent law.

The invention claimed is:

1. A vehicular window assembly, said vehicular window assembly comprising:
   a frame configured to fixedly mount to a vehicle, said frame comprising a pair of opposite side frame members, an upper frame member and a lower frame member;
   a fixed window panel disposed at a lower portion of said side frame members and at said lower frame member;
   a movable window panel movably disposed at said side frame members and movable relative to said fixed window panel and said frame between an opened position and a closed position;
   wherein each of said side frame members includes a lower channel for receiving a respective side perimeter edge region of said fixed window panel and a respective end region of said lower frame member;
   an elastomeric seal overmolded along and in said lower channel of each of said side frame members;
   wherein said elastomeric seal comprises a sealing channel that receives and seals against (i) the respective side perimeter edge region of said fixed window panel and (ii) the respective end region of said lower frame member; and
   wherein a lower end portion of said sealing channel of said elastomeric seal that receives the respective end region of said lower frame member has a greater width dimension than the width dimension of the portion of said sealing channel that receives the respective side perimeter edge region of said fixed window panel.

2. The vehicular window assembly of claim 1, wherein said side frame members of said frame comprise polymeric members.

3. The vehicular window assembly of claim 2, wherein said side frame members comprise molded polymeric members formed via an injection molding process.

4. The vehicular window assembly of claim 2, wherein said side frame members and said elastomeric seal are molded via a two shot molding process that molds said side frame members in a first molding process and molds said elastomeric seal at said side frame members in a second molding process.

5. The vehicular window assembly of claim 1, wherein said elastomeric seal is retained at said lower channel of the respective side frame member via a portion of said elastomeric seal protruding through apertures formed through the respective side frame member at said lower channel.

6. The vehicular window assembly of claim 1, wherein a center frame member is disposed along an upper edge region of said fixed window panel, and wherein said sealing channel of said elastomeric seal of each of said side frame members is configured to receive and seal against a respective end region of said center frame member.

7. The vehicular window assembly of claim 6, wherein an upper portion of said sealing channel of said elastomeric seal that receives the respective end region of said upper frame member has a greater width dimension than the width dimension of the portion of said sealing channel that receives the respective side perimeter edge region of said fixed window panel.

8. The vehicular window assembly of claim 1, wherein said movable window panel is vertically movable relative to said frame and said fixed window panel when said vehicular window assembly is mounted at the vehicle.

9. The vehicular window assembly of claim 1, wherein said movable window panel is retainable in a selected one of a plurality of positions between the opened position and the closed position.

10. The vehicular window assembly of claim 1, wherein said movable window panel is circumscribed by a movable frame having opposite side frame portions and upper and lower frame portions.

11. The vehicular window assembly of claim 10, wherein a respective end of said upper frame portion of said movable frame is movably received in an upper channel of each of said side frame members.

12. The vehicular window assembly of claim 11, wherein said side frame portions of said movable frame are received in respective movable window channels of said side frame members, and wherein said movable window channels are parallel to said upper channels and said lower channels of said side frame members.

13. The vehicular window assembly of claim 12, wherein said upper channels of said side frame members comprise a plurality of stop elements that function to retain said movable window panel in a selected one of a plurality of positions between the opened position and the closed position.

14. The vehicular window assembly of claim 1, wherein said vehicular window assembly is configured to mount at a side of a bus.

15. The vehicular window assembly of claim 1, wherein said lower channel of each of said side frame members has a constant width dimension.

16. A vehicular window assembly, said vehicular window assembly comprising:
   a frame configured to fixedly mount to a vehicle, said frame comprising a pair of opposite side frame members, an upper frame member and a lower frame member;
   a fixed window panel disposed at a lower portion of said side frame members and at said lower frame member;
   a center frame member disposed along an upper edge region of said fixed window panel;
   a movable window panel circumscribed by a movable frame having opposite side frame portions and upper and lower frame portions, wherein said opposite side frame portions of said movable frame are movably disposed at said side frame members, and wherein said movable window panel and said movable frame are movable relative to said fixed window panel and said frame between an opened position and a closed position;
   wherein each of said side frame members includes a lower channel for receiving a respective side perimeter edge region of said fixed window panel and a respective end region of said lower frame member;
   wherein each of said side frame members includes a movable window channel parallel to and adjacent to said lower channel, and wherein each of said side frame portions of said movable frame are received in and are movable along the respective movable window channel;
   an elastomeric seal overmolded along and in said lower channel of each of said side frame members;
   wherein said elastomeric seal comprises a sealing channel that receives and seals against (i) the respective side perimeter edge region of said fixed window panel, (ii) the respective end region of said lower frame member and (iii) the respective end region of said center frame member;
   wherein a lower end portion of said sealing channel of said elastomeric seal that receives the respective end region of said lower frame member has a greater width dimension than the width dimension of the portion of said sealing channel that receives the respective side perimeter edge region of said fixed window panel; and
   wherein an upper end portion of said sealing channel of said elastomeric seal that receives the respective end region of said center frame member has a greater width dimension than the width dimension of the portion of said sealing channel that receives the respective side perimeter edge region of said fixed window panel.

17. The vehicular window assembly of claim 16, wherein said side frame members of said frame comprise polymeric members, and wherein said side frame members comprise molded polymeric members formed via an injection molding process.

18. The vehicular window assembly of claim 17, wherein said side frame members and said elastomeric seal are molded via a two shot molding process that molds said side frame members in a first molding process and molds said elastomeric seal at said side frame members in a second molding process.

19. The vehicular window assembly of claim 16, wherein said elastomeric seal is retained at said lower channel of the respective side frame member via a portion of said elastomeric seal protruding through apertures formed through the respective side frame member at said lower channel.

20. The vehicular window assembly of claim 16, wherein said lower channel of each of said side frame members has a constant width dimension.

21. The vehicular window assembly of claim 16, wherein a respective end of said upper frame portion of said movable frame is movably received in an upper channel of each of said side frame members, and wherein said upper channels of said side frame members comprise a plurality of stop elements that function to retain said movable window panel in a selected one of a plurality of positions between the opened position and the closed position.

22. The vehicular window assembly of claim 16, wherein said vehicular window assembly is configured to mount at a side of a bus.

* * * * *